(12) United States Patent
Engstrand

(10) Patent No.: US 7,294,823 B2
(45) Date of Patent: Nov. 13, 2007

(54) SYSTEM AND METHOD FOR DETECTING A POSITION OF A MOVABLE ELEMENT

(75) Inventor: Bradley Engstrand, Hartford, WI (US)

(73) Assignee: Phaedrus, LLC, Hartford, WI (US)

( * ) Notice: Subject to any disclaimer, the term of this patent is extended or adjusted under 35 U.S.C. 154(b) by 0 days.

(21) Appl. No.: 11/242,799

(22) Filed: Oct. 3, 2005

(65) Prior Publication Data

US 2006/0065822 A1    Mar. 30, 2006

Related U.S. Application Data

(63) Continuation-in-part of application No. 09/690,151, filed on Oct. 17, 2000, now Pat. No. 6,952,009.

(51) Int. Cl.
*G01D 5/34* (2006.01)
*F01B 25/26* (2006.01)

(52) U.S. Cl. .................. 250/231.1; 91/1

(58) Field of Classification Search ............ 250/231.1, 250/221, 573; 92/5 R; 91/1; 73/1.19, 1.22
See application file for complete search history.

(56) References Cited

U.S. PATENT DOCUMENTS

| | | |
|---|---|---|
| 3,368,751 A | 2/1968 | Merrill |
| 3,885,875 A | 5/1975 | Howe, Jr. et al. |
| 4,150,299 A | 4/1979 | Kasiewicz et al. |
| 4,501,642 A | 2/1985 | Wells |
| 4,661,695 A | 4/1987 | Mori et al. |
| 4,736,674 A | 4/1988 | Stoll |
| 4,806,707 A | 2/1989 | Landmeier |
| 4,902,903 A | 2/1990 | Segerson et al. |
| 4,970,361 A | 11/1990 | Fuse |
| 5,182,979 A | 2/1993 | Morgan |
| 5,231,959 A | 8/1993 | Smietana |
| 5,271,505 A | 12/1993 | Low |
| 5,684,246 A * | 11/1997 | Korpi .................. 73/1.36 |
| 5,705,742 A | 1/1998 | Fox et al. |
| 5,744,705 A | 4/1998 | Derouen et al. |
| 6,952,009 B1 | 7/1998 | Brunet et al. |
| 5,799,629 A | 9/1998 | Lowi, Jr. |
| 5,977,778 A | 11/1999 | Chan et al. |
| 5,988,676 A | 11/1999 | Lolito et al. |
| 6,058,776 A | 5/2000 | Algers et al. |
| 6,484,620 B2 * | 11/2002 | Arshad et al. ............ 92/5 R |
| 2004/0089797 A1 | 5/2004 | Engstrand |

OTHER PUBLICATIONS

U.S. Appl. No. 11/238,893, filed Sep. 9, 2005, Engstrand.

* cited by examiner

*Primary Examiner*—Thanh X. Luu
(74) *Attorney, Agent, or Firm*—Patents+TMS, P.C.

(57) ABSTRACT

A system and a method detect a position of a movable element within an interior of a compartment. The interior of the compartment has a light source, a light sensor, a base, a support and/or a movable element. The base is located between and/or is connected to the light source, the light sensor and/or the interior surface of the compartment. The base prevents the light source from being directed towards the light sensor. The light sensor detects an intensity of an emitted light in the interior of the compartment. The intensity of the emitted light detected by the light sensor corresponds to a position of the movable element within the interior of the compartment. The light sensor detects, measures, calculates and/or determines the position of the movable element based on the intensity of the emitted light within the interior of the compartment.

6 Claims, 4 Drawing Sheets

SYSTEM AND METHOD FOR DETECTING A POSITION OF A MOVABLE ELEMENT

This application is a Continuation-In-Part Application of U.S. patent application Ser. No. 09/690,151 filed on Oct. 17, 2000 now U.S. Pat. No. 6,952,009.

BACKGROUND OF THE INVENTION

The present invention generally relates to a system and a method for detecting a position of a movable element. More specifically, the present invention relates to a system and a method for detecting a position of a movable element in an interior of a compartment. The system may have a light source for emitting light in the interior of the compartment and/or a light sensor for detecting an intensity of emitted light within the interior of the compartment. A base may be connected to the interior of the compartment and/or may be located between the light source and the light sensor. The base may obstruct and/or may prevent the light emitted from the light source from being directed at the light sensor. The intensity of emitted light which may be detected by the light sensor may correspond to a position of a movable element within an interior of the compartment.

A microprocessor may determine and/or may calculate the position of the movable element within the compartment based on the intensity of emitted light detected by the light sensor. The intensity of the emitted light may be based on an amount of the emitted light which may not be absorbed by an interior of the compartment, the movable element and/or the base. An output device may be connected to the microprocessor and/or may display information based on the intensity of emitted light detected by the light sensor and/or the position of the movable element.

It is, of course, generally known to measure and/or to detect a position of a movable element within an interior of a compartment. The position of the movable element in the interior of the compartment may correspond to a location of a machine element which may be connected to and/or may be attached to the movable element. Typically, a first sensor in the compartment or adjacent to the movable element must contact the movable element to detect, to determine and/or to measure the position of the movable element with respect to the compartment. A position of the movable element within the interior of the compartment may correspond to a position of the machine element with respect to the compartment. A second sensor may be required to be attached to, to be connected to and/or to contact the movable element, the machine element and/or the compartment to increase an accuracy of the first sensor for detecting and/or for measuring the position of the movable element and/or the machine part.

However, contact between the movable element and the first sensor may cause the first sensor to inaccurately detect and/or to inaccurately measure the position of the movable element in the compartment. Further, contact between the movable element and the first sensor may damage and/or may destroy the movable element and/or the first sensor. As a result, the first sensor may be inoperable or may inaccurately detect and/or may inaccurately measure the position of the movable element in the compartment. Moreover, contact between the second sensor and the movable element and/or the machine element may damage and/or may destroy the second sensor, the movable element and/or the machine element. As a result, the second sensor may be inoperable or may be incapable of increasing the accuracy of the first sensor.

A need, therefore, exists for a system and a method for detecting a position of a movable element. Additionally, a need exists for a system and a method for detecting a position of a movable element which may have a a light source and/or a light sensor in a compartment for detecting a position of a movable element in the compartment. Further, a need exists for an apparatus, a system and a method for detecting a position of a movable element which may detect and/or may measure an intensity of emitted light unabsorbed by an interior surface of the compartment, a base in an interior of the compartment and/or by a movable element in an interior of the compartment. Still further, a need exists for a system and a method for detecting a position of a movable element which may have a base located between a light sensor and/or a light source. Moreover, a need exists for a system and a method for detecting a position of a movable element which may have a base connected to an interior of the compartment for preventing light from a light source from being directed towards a light sensor.

SUMMARY OF THE INVENTION

The present invention provides a system and a method for detecting a position of a movable element. The movable element may be within an interior of the compartment. The system may have a light source, a base and/or a light sensor attached and/or connected to the interior of the compartment. The base may be located between the light source and the light sensor. The movable element and/or an interior surface of the compartment may absorb emitted light from the light source in the compartment. The light sensor may determine and/or may measure an intensity of emitted light from the light source which may not be absorbed by the movable element, the base and/or the interior surface of the compartment. The intensity of emitted light may be based on and/or may be indicative of an amount of emitted light absorbed by the movable element, the base and/or the interior surface of the compartment. A microprocessor may detect, may measure and/or may calculate the position of the movable element in the compartment based on the intensity of emitted light in the compartment which may be detected by the light sensor.

To this end, in an embodiment of the present invention, system for detecting a position is provided. The system has a compartment having a body defining an interior wherein the body has an interior surface and a length wherein the length is defined between a first end and a second end. Further, the system has a movable element within the interior of the compartment wherein the movable element is located at a position in the interior. Still further, the system has a first wall at the first end wherein the first wall abuts the body of the compartment. Moreover, the system has a light source connected to the first wall wherein the light source emits light into the interior of the compartment. Furthermore, the system has a sensor connected to the first wall wherein the light from the light source is emitted outward with respect to the sensor wherein the sensor detects an intensity of emitted light within the interior and further wherein the intensity of emitted light corresponds to the position of the movable element within the interior of the compartment.

In an embodiment, the system has a second wall at the second end wherein the second wall abuts the body of the compartment.

In an embodiment, the system has a support connecting the light source or the sensor to the interior surface of the compartment.

In an embodiment, the system has a base connecting the light source and the sensor.

In an embodiment, the system has a base attached to the first wall wherein the base is located between the light source and the sensor.

In an embodiment, the system has a microprocessor in communication with the sensor wherein the microprocessor determines the position of the movable element.

In an embodiment, the system has an output device connected to the sensor wherein the output device displays the position of the movable element.

In another embodiment of the present invention, a method for detecting a position is provided. The method has the step of providing a compartment having a body defining an interior wherein the body has an interior surface and a length wherein the length is defined between a first end and a second end wherein the compartment has a first wall at the first end wherein the first wall abuts the body of the compartment. Further, the method has the step of connecting a movable element to the compartment wherein the movable element is located at a first position with respect to the first wall. Still further, the method has the step of connecting a base to the interior surface of the compartment wherein the base has a first side and a second side opposite to the first side. Moreover, the method has the steps of emitting a light from the first side of the base and detecting an intensity of emitted light within the interior from the second side of the base.

In an embodiment, the method has the step of determining the first position of the movable element base on the intensity of emitted light within the interior.

In an embodiment, the method has the step of moving the movable element to a second position with respect to the first wall of the compartment.

In an embodiment, the method has the step of inserting the movable element into the interior of the compartment.

In an embodiment, the method has the step of displaying information based on the intensity of emitted light within the interior of the compartment.

In an embodiment, the method has the step of attaching a second wall to the second end of the compartment.

In another embodiment of the present invention, a method for detecting a position is provided. The method has the step of providing a compartment having a body defining an interior wherein the body has an interior surface and a length wherein the length is defined between a first end and a second end wherein the compartment has a first wall at the first end wherein the first wall abuts the body of the compartment wherein the first wall has a base wherein the base extends inward with respect to the interior of the compartment wherein the base has a first side and a second side opposite to the first side. Further, the method has the step of connecting a movable element to the compartment wherein the movable element is located at a first position with respect to the first wall. Still further, the method has the step of connecting a light source to the first wall wherein the light source is adjacent to the first side of the base wherein the light source emits into the interior of the compartment. Moreover, the method has the step of connecting a sensor to the first wall wherein the sensor is adjacent to the second side of the base wherein the base is located between the light source and the sensor wherein the sensor detects an intensity of emitted light within the interior.

In an embodiment, the method has the step of determining the first position of the movable element is based on the intensity of emitted light within the interior.

In an embodiment, the method has the step of moving the movable element to a second position with respect to the first wall of the compartment.

In an embodiment, the method has the step of inserting the movable element into the interior of the compartment.

In an embodiment, the method has the step of displaying information based on the intensity of emitted light within the interior of the compartment.

In an embodiment, the method has the step of attaching a second wall to the second end of the compartment.

In an embodiment, the method has the step of connecting a microprocessor to the sensor wherein the microprocessor is in communication with the sensor.

It is, therefore, an advantage of the present invention to provide a system and a method for detecting a position of a movable element which may have a compartment with an interior and/or a movable element, a base, a light source and/or a light sensor in the interior of the compartment.

Another advantage of the present invention is to provide a system and a method for detecting a position of a movable element which may have a light source and/or a light sensor in an interior of compartment for emitting light and/or for detecting, respectively, an intensity of an emitted light in the compartment.

And, another advantage of the present invention is to provide a system and a method for detecting a position of a movable element which may have an interior of a compartment and/or a movable element and/or a base in the interior for absorbing light emitted from a light source in the interior of the compartment.

Yet another advantage of the present invention is to provide a system and a method for detecting a position of a movable element which may have a light sensor for measuring an intensity of emitted light in a compartment to determine the position of a movable element in the compartment.

A further advantage of the present invention is to provide a system and a method for detecting a position of a movable element which may have a base located between a light source and a light sensor.

Moreover, an advantage of the present invention is to provide a system and a method for detecting a position of a movable element which may have a base to prevent light from being emitted towards and/or directed towards a light sensor.

And, another advantage of the present invention is to provide a system and a method for detecting a position of a movable element which may have a microprocessor and/or an output device to illustrate, to process, to calculate, to display and/or to communicate information based on an intensity of emitted light and/or a position of a movable element in an interior of a compartment.

Yet another advantage of the present invention is to provide a system and a method for detecting a position of a movable element which may have a support for attaching a base, a light source and/or a light sensor to an interior of the compartment.

Another advantage of the present invention is to provide a system and a method for detecting a position of a movable element which may have a base attached to a wall of an interior of a compartment.

Yet another advantage of the present invention is to provide a system and a method for detecting a position of a movable element which may emit light into an interior of a compartment and/or outward with respect to a light sensor.

A still further advantage of the present invention is to provide a system and a method for detecting a position of a movable element which may have a base connected to a light source and/or a light sensor.

Moreover, an advantage of the present invention is to provide a system and a method for detecting a position of a movable element which may have a rod attaching a light sensor and/or a light source to an interior of a compartment.

Additional features and advantages of the present invention are described in, and will be apparent from, the detailed description of the presently preferred embodiments and from the drawings.

DETAILED DESCRIPTION OF THE PRESENTLY PREFERRED EMBODIMENTS

The present invention generally relates to a system and a method for detecting a position of a movable element. The apparatus, the system and the method may have a compartment with an interior, an exterior and/or an interior surface. The apparatus, the system and the method may have a light source, a light sensor, a base, a support and/or a movable element in the interior of the compartment. The base may be located between and/or may be connected to the light source, the light sensor and/or the interior surface of the compartment. The light sensor may detect an intensity of an emitted light in the interior of the compartment. The intensity of the emitted light detected by the light sensor may correspond to a position of the movable element within the interior of the compartment. The light sensor may detect, may measure, may calculate and/or may determine the position of the movable element based on the intensity of the emitted light within the interior of the compartment.

Figure 1:
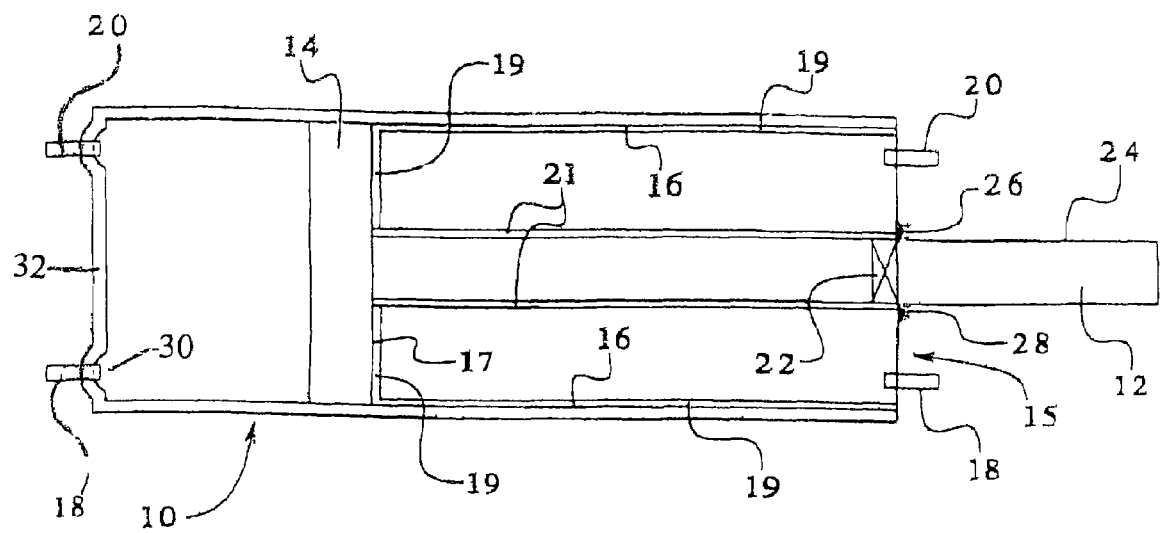
FIG. 1 illustrates a cross-sectional view of a cylinder showing sensor placement and cleaning elements of an embodiment of the present invention.

Referring now to the drawings wherein like numerals refer to like parts, FIG. 1 illustrates a cylinder machine element 10 having a shaft element 12 and a head 14 that operates cooperatively with the cylinder 10 in a manner well-known to one of ordinary skill in the art. The cylinder 10 may preferably be hydraulic or pneumatic. The cylinder 10 may also be any other type of cylinder known to one of ordinary skill in the art.

The cylinder 10 further may have an end wall 15 that may be perpendicular to the shaft 12 and that may substantially enclose the cylinder 10. The end wall 15 may surround the shaft 12. A light source 18 may be positioned on the end wall 15 of the cylinder 10 with the light from the light source 18 projecting into the interior of the cylinder 10. The light source 18 may be an LED light source or any other light source known by those skilled in the art. In addition, a light sensor 20 may also be placed on the end wall 15 of the cylinder 10 with the detecting portion of the sensor 20 directed towards the interior of the cylinder 10. The light sensor 20 measures the intensity of light within the cylinder 10 emitted by the light source 18 into the interior of the cylinder 10.

The cylinder 10 has an interior wall 16. The interior wall 16 may be coated with a substance 19 that may absorb a portion of the light emitted from the light source 18. The light absorbing coating 19 may be an anodizing compound. The surface 17 of the head 14 may also be coated with the light absorbing substance 19 or may be covered with a nitrile compound or other coating known by those skilled in the art to be light absorbing. Furthermore, the surface 24 of the shaft 12 may also be coated with a light absorbing substance 21 such as a nitrile compound, ceramic compound, or any other compound known by those skilled in the art to be coated onto a shaft that may also provide light absorbing and contaminant preventative properties. The coatings 19, 21 may have various colors that may affect and/or control the amount of light absorption.

As the head 14 and the shaft 12 transpose through the cylinder 10, a portion of the light emitted from the light source 18 may be absorbed by the coating 19 on the interior wall 16. A portion of the light emitted by the light source 18 may also be absorbed by the coating 19, 21 on the head surface 17. Lastly, a portion of the light emitted by the light source 18 may be absorbed by the coating 21 on the shaft surface 24. The light sensor 20 measures the intensity of light within the interior of the cylinder 10 that is not absorbed by the coatings 19, 21. The light sensor 20 may then transmit a signal indicative of the intensity to a processor 104, represented in FIG. 2. The processor 104 may be programmed to translate the measured intensity of the light emitted by the light source 18 that is within the cylinder 10 into a position measurement of the head 14 or shaft 12 within the cylinder 10.

In an alternate embodiment of the present invention, the cylinder 10 may have a groove 30 within an interior of an opposing end wall 32. Located within the groove 30 may be an additional light source 18 and/or an additional sensor 20. An advantage of placing the additional light source 18 and the additional sensor 20 within the groove may be to prevent the shaft element 12 and the head 14 from closing off the light path as the shaft element 12 and the head 14 move throughout the cylinder. A further advantage of placing the additional light source 18 and the additional sensor 20 within the opposing end wall 32 may be to obtain an average of two sensor readings which may provide greater accuracy in position measurement. In addition, the groove 30 may also be placed within the end wall 15 with the light source 18 and the sensor 20 placed within the groove 30.

Figure 2:
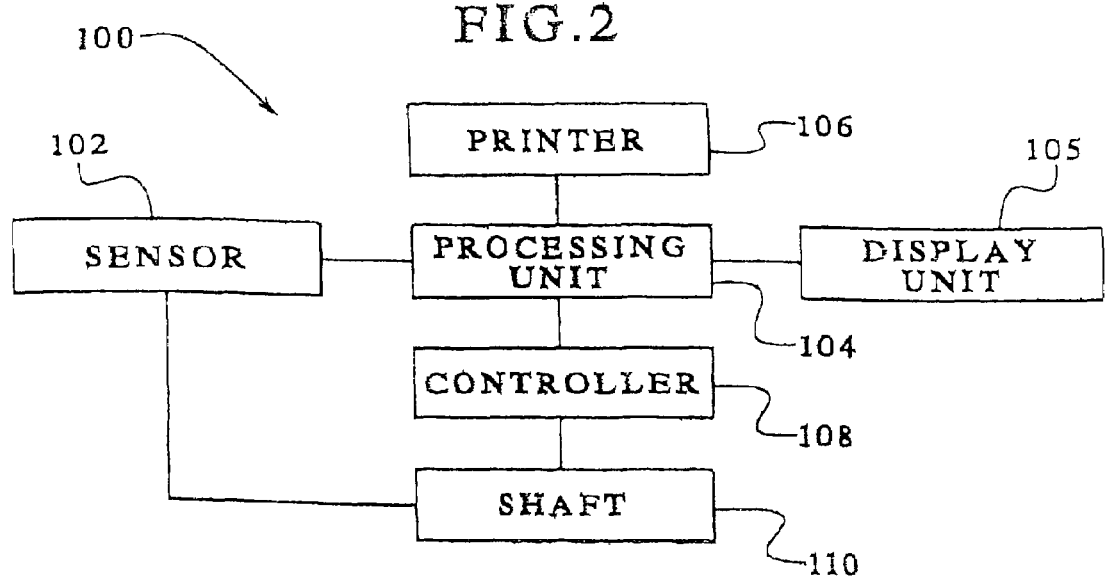
FIG. 2 illustrates a black box diagram of an embodiment of the system of the present invention.

FIG. 2 illustrates, in a black box diagram, an embodiment of a system 100 of the present invention. The system 100 includes a sensor 102 which may detect the intensity of light emitted by the light source 18 within the interior of the cylinder 10 that is not absorbed by the coatings 19, 21 within the system 100. An output signal from the sensor 102 may be transmitted to the processor 104 for signal interpretation and/or processing. The processor 104 may determine the position of the shaft 12 or head 14 within the cylinder 10.

A display unit 105 may be provided to display the absolute or relative position of the sensed shaft 12. A printer 106 may also be provided to print the results of the absolute or relative position of the shaft 12.

The processor 104 may be connected to a controller 108. After the output signal of the sensor 102 is processed by the processor 104, a signal may be transmitted to the controller 108. The controller 108 may then adjust the position of a machine element 110, such as a valve, which may affect the movement of the shaft 12 within the cylinder 10. The new position of the shaft 12 may provide the sensor 102 with a subsequent measurement which may eventually be processed by the processor 104 and may determine whether the machine element 110 may be adjusted to affect the position of the shaft 12 within the cylinder 10.

FIG. 1 also illustrates a seal 22 which may be engaged onto the shaft 12. The seal 22 may be positioned near the end wall 15 of the cylinder 10. The seal 22 may be made from, for example, rubber. A first brush 26 may be positioned near the end wall 15 of the cylinder 10 as illustrated in FIG. 1. The first brush 26 may be a wire brush, preferably made from, for example, steel or any other metal or other material known by one of ordinary skill in the art. A second brush 28 may also be positioned near the end wall 15 of the cylinder 10 diametrically opposed to the first brush 26. The second brush may be made from, for example, bronze or any other metal or other material known by one of ordinary skill in the art.

The first brush 26 and the second brush 28 may be in contact with the surface 24 of the shaft 12. As the shaft 12 moves laterally through the cylinder 10, the first brush 26 and the second brush 28 may scrape contaminants, such as weld spatter, which may be deposited onto the surface 24 of the shaft 12. By scraping contaminants from the shaft 12, the first brush 26 and the second brush 28 allow the shaft 12 to move more efficiently through the cylinder, thus providing more accurate position measurements. The coating 21 on the surface 24 of the shaft 12 may be a nitrile coating, a ceramic coating or any other coating known by those skilled in the art capable of light absorption and also capable of preventing and/or reducing the accumulation of contaminants onto a surface 24 of the shaft 12.

Figure 3:
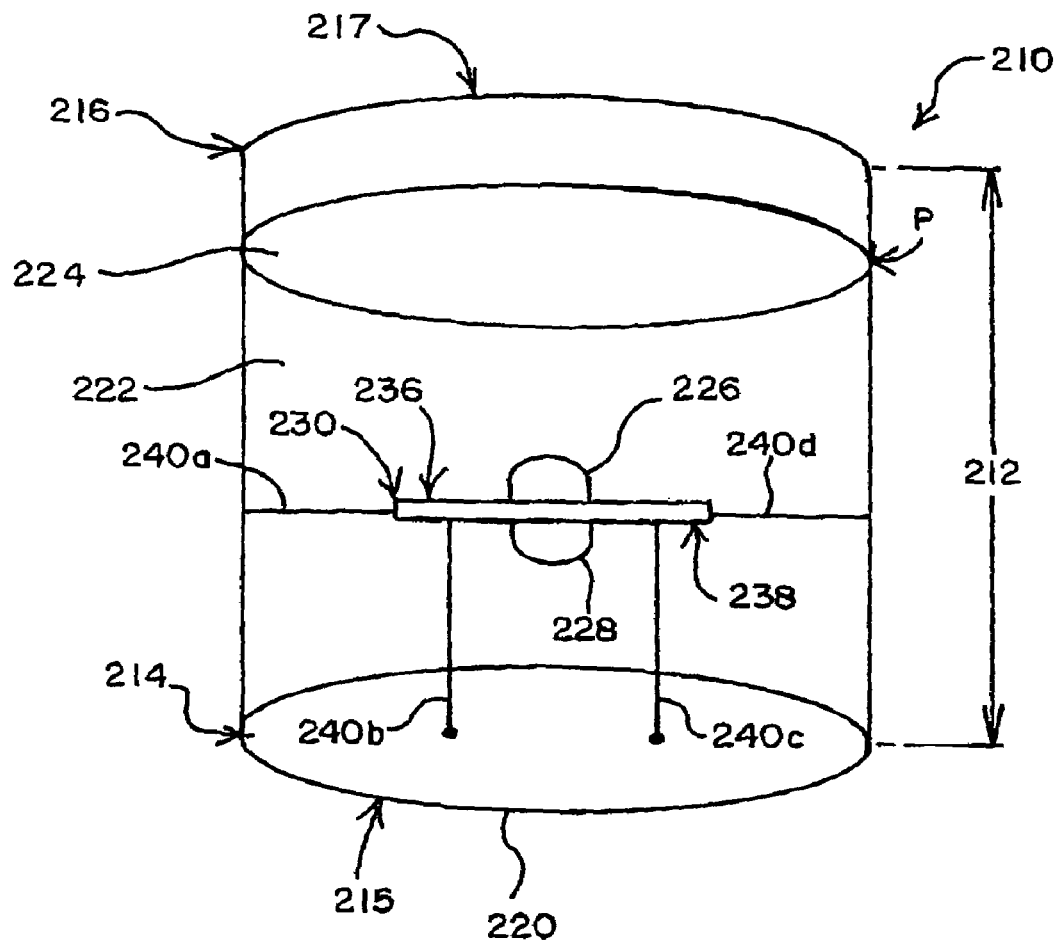
FIG. 3 illustrates a perspective view of a compartment with a movable element, a light source and a light sensor in an embodiment of the present invention.
Figure 4:
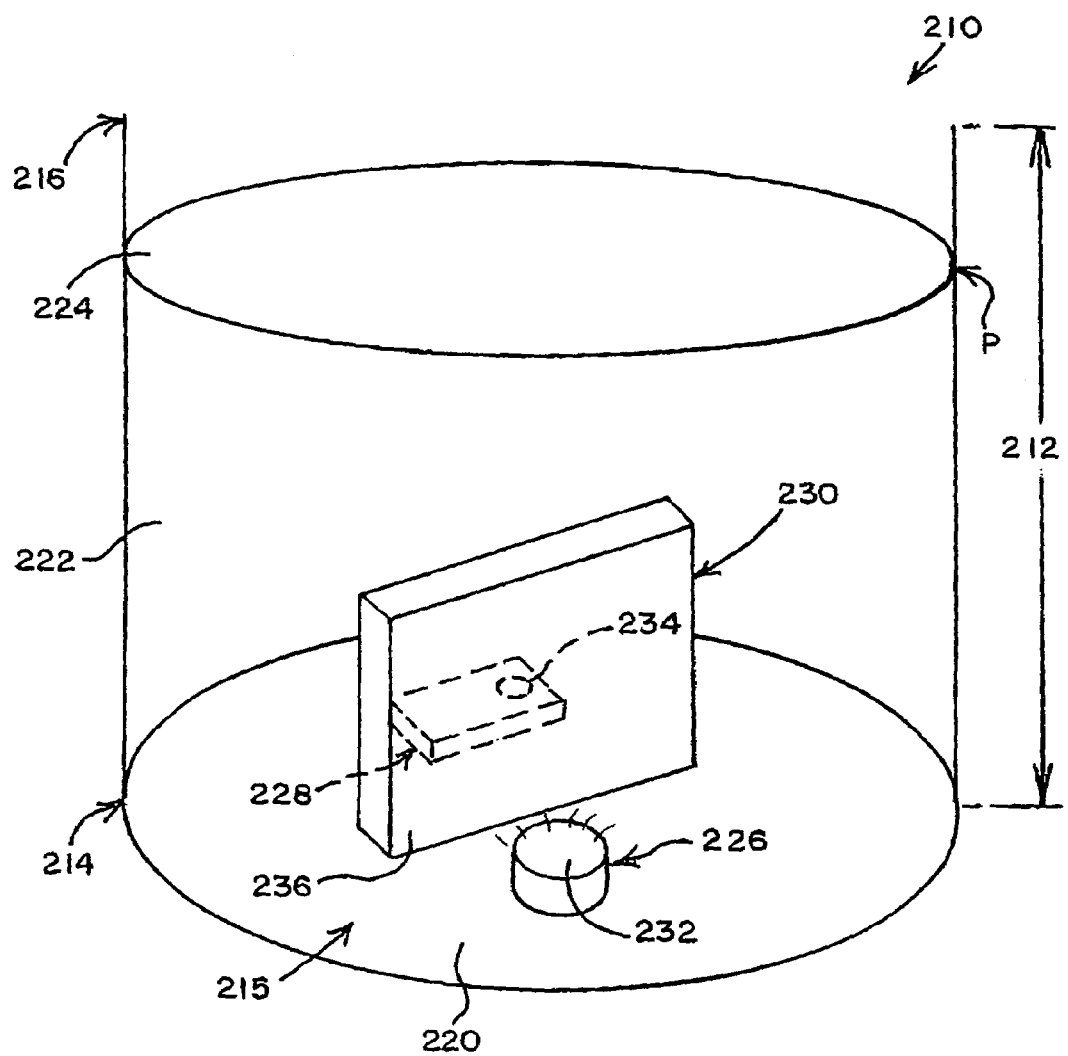
FIG. 4 illustrates a perspective view of a compartment with a movable element, a light source and a light sensor in an embodiment of the present invention.

FIGS. 3 and 4 illustrate a compartment 210 which may have a length 212 defined between a first end 214 and a second end 216. The second end 216 is opposite to the first end 214. The first end 214 and/or the second end 216 may have a first wall 215 and/or a second wall 217, respectively. The compartment 210 may have an interior surface 220 which may define an interior 222. The first wall 215 and/or the second wall 217 may be perpendicular to the interior surface 220 and/or may substantially enclose the compartment 210. The compartment 210 may be a type of cylinder, such as, for example, a hydraulic cylinder, a pneumatic cylinder and/or the like. The compartment 10 may be, for example, a hollow tube and/or the like. The present invention should not be deemed as limited to a specific embodiment of the type of the cylinder of the compartment 210.

The compartment 210 may have a movable element 224 which may be position and/or may be located in the interior 222 of the compartment 210. The movable element 224 may move in the interior 222 of the compartment 210 between the first end 214 and the second end 216. The movable element 224 may move to, may be positioned at and/or may be located at a position P in the interior 222 of the compartment 210 between the first end 214 and the second end 216. The movable element 224 may be, for example, a piston, a sphere, a machine element, a tab, a flange, a spring, a magnet, a closed tube and/or the like. The present invention should not be deemed as limited to a specific embodiment of the movable element 224. It should be understood that the movable element 224 may be any movable element as known to one of ordinary skill in the art.

The interior 222 of the compartment 210 may have a light source 226, a light sensor 228 and/or a base 230. The base may be located between the light source 226 and the light sensor 228. The light source 226, the light sensor 228 and/or the base 230 may be positioned on the interior surface 220, on the first end 215 of the compartment 210 and/or within the interior 222 of the compartment 210. The light source 226 may have a light emitting portion 232 directed inward with respect to the interior 222 of the compartment 210 as shown in FIG. 4. The light source 226 may project and/or may emit light into the interior 222 of the compartment 210. The light emitting portion 232 of the light source 226 may be, for example, an light emitting diode (hereinafter "LED"), a halogen light, a flourescent light, an incandescent light, a neon light and/or the like. The present invention may not be deemed as limited to a specific embodiment of the light source 226. It should be understood that the light source 226 may have any light source capable of projecting and/or of emitting light as known to one of ordinary skill in the art.

The light sensor 228 may have a detecting portion directed 234 inward with respect to the interior 222 of the compartment 210 as shown in FIG. 4. The light sensor 228 may detect, may determine and/or may measure an intensity of the emitted light into the interior 222 of the compartment 210. Further, the light sensor 228 may detect, may determine and/or may measure a strength of the light emitted into the interior 222 of the compartment 210. It should be understood that the light sensor 228 may be any sensor capable of detecting, of determining and/or of measuring the intensity of the light in and/or the strength of the light emitted into the interior 222 of the compartment 210 as known to one of ordinary skill in the art.

As illustrated in FIG. 3, the light source 226 may be attached to and/or may be connected to a first side 236 of the base 230. The light sensor 228 may be attached to and/or may be connected to a second side 238 of the base 230. The first side 236 may be opposite to the second side 238 of the base 230. The base 230 may be attached and/or connected to the interior surface 220 of the compartment 210. Supports 240a-240d may be attached to the interior surface 220 and/or the base 230. As a result, the light source 226, the light sensor 228 and/or the base 230 may be attached to and/or may be connected to the interior surface 220 of the compartment 210. Further, the light source 226, the light sensor 228 and/or the base 230 may be located within the interior 222 of the compartment 210 via the supports 240a-240d. The supports 240a-240d may be, for example, a bar, a rod, a wire, a cable, a shaft, a pole and/or the like. The present invention may not be deemed as limited to a specific embodiment of the supports 240a-240d. It should be understood that the supports 240a-240d may have any support capable of attaching and/or connecting the base 230 to the interior surface 220 as known to one of ordinary skill in the art.

As illustrated in FIG. 4, the light source 226, the light sensor 228 and/or the base 230 may be attached to the first wall 215. The base 230 may be located between the light source 226 and the light sensor 228. The light source 226 may be adjacent to first side 236 of the base 230. The light sensor 228 may be adjacent to the second side 238 of the base 230. As illustrated in FIGS. 3 and 4, the base 230 may be interposed between the light source 226 and the light sensor 228. The base 230 may prevent light emitted from the light source 226 from being directed towards the light sensor 228. As a result, the light sensor 228 may detect an intensity of light within the interior 222 of the compartment 210.

Further, the base 230 may prevent the light emitting portion 232 from being directed towards the light sensor 228.

The compartment 210, the interior surface 220 of the compartment 210, the base 230, the supports 240a-240d and/or the movable element 224 may be made from a material which may absorb an amount of the light emitted from the light source 226 and/or may have light absorbing properties. The present invention should not be deemed as limited to a specific material of the compartment 210, the interior surface 220 of the compartment 210, the base 230, the supports 240a-240d and/or the movable element 224. It should be understood that the material may be any material and/or any compound which may have light absorbing properties as known to one of ordinary skill in the art.

As the movable element 224 may transpose and/or may move through the compartment 210, a portion of the light emitted from the light source 226 may be absorbed by the movable element 224, the base 230, the supports 240a-240d and/or the interior surface 220 of the compartment 210 between the movable element 224 and the first end 215 of the compartment 210. The portion of the light which may be absorbed by the interior surface 220, the base 230, the supports 240a-240d and/or the movable element 226 may be based on the light absorbing properties of the material of the compartment 210, the base 230, the support 240a-240d and/or the movable element 224. The light sensor 228 may detect, may determine and/or may measure an intensity of light within the interior 222 of the compartment 210 which may not be absorbed by the movable element 224, the base 230, the supports 240a-240d and/or the interior surface 220 between the movable element 224 and the first end 215 of the compartment 210. The intensity of light in the interior 222 of the compartment 210 may not include the portion of light which may be absorbed by the movable element 224, the base 230, the supports 240a-240d and/or the interior surface 220 between the movable element 224 and the first end 215 of the compartment 210.

Figure 5:
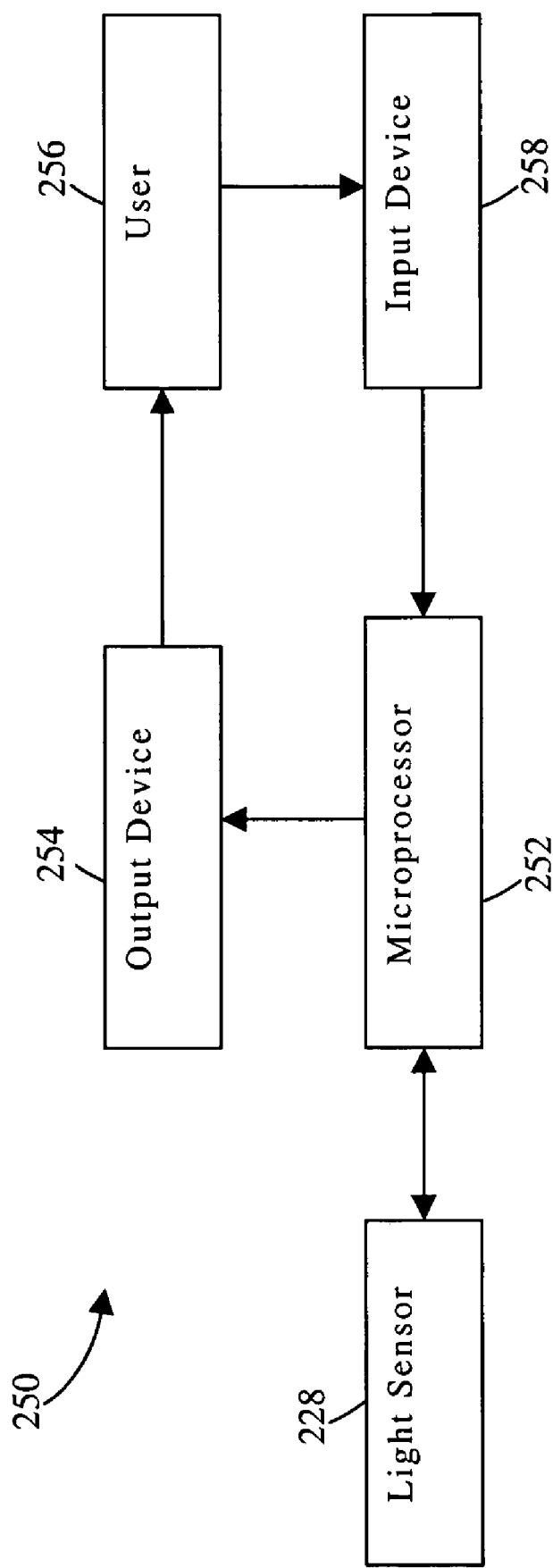
FIG. 5 illustrates a black box diagram of a system in another embodiment of the present invention.

FIG. 5 illustrates, in a black box diagram, an embodiment of a system 250 of the present invention. The light sensor 228 may be connected to and/or may be in communication with a microprocessor 252. The microprocessor 252 may be local with respect to and/or may be remote with respect to the light sensor 228. The light sensor 228 may detect, may measure and/or may determine the intensity of light emitted within the interior 222 of the compartment 210 which may not be absorbed by the movable element 224, the base 230, the supports 240a-240d and/or the interior surface 220 between the movable element 224 and the first end 215 of the compartment 210. The position P of the movable element 224 in the interior 222 of the compartment 210 may correspond to, may relate to and/or may be indicate of the intensity of the emitted light detected by the light sensor 228 within the interior 222. The light sensor 228 may detect, may measure and/or may determine the intensity of the emitted light within the interior 222.

The light sensor 228 may transmit, may send and/or may communicate position information to the microprocessor 252. The position information may relate to, may be based on, may correspond to and/or may be indicative of the intensity of the emitted light detected by the light sensor 228 and/or the position P of the movable element 224. The microprocessor 252 may be programmed to process the position information received from the light source 228. The microprocessor 252 may be programmed to measure, to determine and/or to identify the position P of the movable element 224 in the interior 222 of the compartment 210 based on the position information received from the light sensor 228.

The microprocessor 252 may be connected to and/or may be in communication with an output device 254. The output device 254 may be local with respect to and/or may be remote with respect to the microprocessor 252 and/or the light sensor 228. The output device 254 may be a printer, a monitor, a handheld device, a speaker and/or the like. A output device 254 may display, may indicate and/or may communicate display information to a user 256. The display information may relate to, may correspond to and/or may be based on the position information, the intensity of light emitted and/or the position P of the movable element 224. The output device 254 may print a hard copy illustrating the display information for the user 256. It should be understood that the output device 254 may be any output device capable of communicating the display information to the user 256 known to one of ordinary skill in the art.

The display information may be, for example, logarithmic, linear and/or the like. Further, the display information may be in one or more formats, such as, for example, voltages, currents, pulses, numbers and/or the like. The microprocessor 252 may be programmed to convert, to format and/or to transform the display information between the one or more formats. The present invention should not be deemed as limited to a specific embodiment of the one or more formats of the display information. It should be understood that the format of the display information may be any format known to one of ordinary skill in the art.

An input device 258 may be connected to and/or in communication with the microprocessor 252. The input device 258 may be utilized by the user 256 to operate, to control and/or to instruct the microprocessor 252. The input device 258 may be a keyboard, a handheld device, a wireless portable device, a dial, a switch and/or the like. The input device 258 may be remote with respect to the microprocessor 252 and/or the output device 254. The microprocessor 252 may be programmed to received instructions from the user 256 via the input device 258. The user 256 may select and/or may control the output device 254, the display information and/or the one or more formats of the display information via the input device 258. The present invention should not be deemed as limited to a specific embodiment of the input device 258. It should be understood that the input device 258 may be any input device capable of communicating instructions to the microprocessor 252.

The compartment 210 may have the light source 226, the base 230 and/or the light sensor 228 attached and/or connected to the interior 222 of the compartment 210. The base 230 may be located between the light source 226 and the light sensor 228. The movable element 224 and/or an interior surface 220 of the compartment 210 may absorb emitted light from the light source 226 in the compartment 210. The light sensor 228 may determine and/or may measure an intensity of emitted light from the light source which may not be absorbed by the movable element 224, the base 230, the supports 240a-240d and/or the interior surface 220 of the compartment 210. The intensity of emitted light may be based on and/or may be indicative of an amount of emitted light absorbed by the movable element 224, the base 230, the supports 240a-240d and/or the interior surface 220 of the compartment 210. A microprocessor 250 may detect, may measure and/or may calculate the position P of the movable element 224 in the compartment 210 based on the intensity of emitted light in the compartment 210 which may be detected by the light sensor 228.

The various embodiments of the present invention may be operated by any power supply known by those skilled in the art. In addition, the various embodiments may be operated in and/or may be operated from remote locations through the use of an electric generator, a pressurized air line, or the like.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

I claim:

1. A method for detecting a position, the method comprising the steps of:

providing a compartment having a body defining an interior wherein the body has an interior surface and a length wherein the length is defined between a first end and a second end wherein the compartment has a first wall at the first end wherein the first wall abuts the body of the compartment;

connecting a movable element to the compartment wherein the movable element is located at a first position with respect to the first wall;

connecting a base to the interior surface of the compartment wherein the base has a first side and a second side opposite to the first side wherein the first side of the base faces the first end of the compartment and the second side of the base faces the second end of the compartment;

emitting a light from the first side of the base; and detecting an intensity of emitted light within the interior from the second side of the base.

2. The method of claim 1 further comprising the step of:

determining the first position of the movable element based on the intensity of emitted light within the interior.

3. The method of claim 1 further comprising the step of:

moving the movable element to a second position with respect to the first wall of the compartment.

4. The method of claim 1 further comprising the step of:

inserting the movable element into the interior of the compartment.

5. The method of claim 1 further comprising the step of:

displaying information based on the intensity of emitted light within the interior of the compartment.

6. The method of claim 1 further comprising the step of:

enclosing the second end of the compartment.

* * * * *